Dec. 12, 1972  R. I. KLEIN ET AL  3,706,030
ELECTRONIC PARTICLE DETECTOR OF THE COULTER TYPE HAVING
CONDUCTIVITY CHANGE INDEPENDENCE CIRCUITRY
Filed Dec. 28, 1970  3 Sheets-Sheet 1
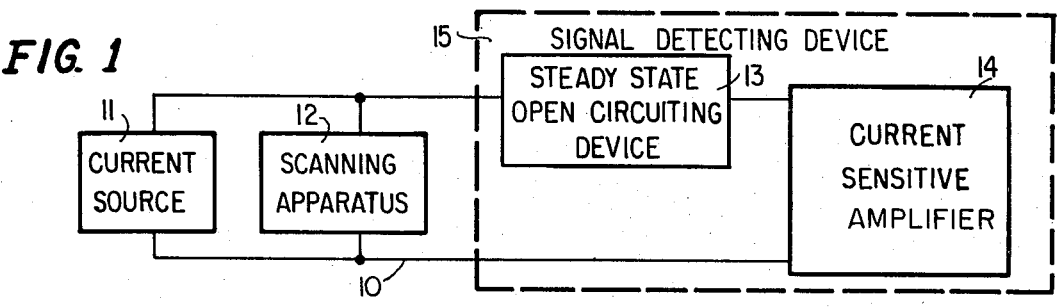
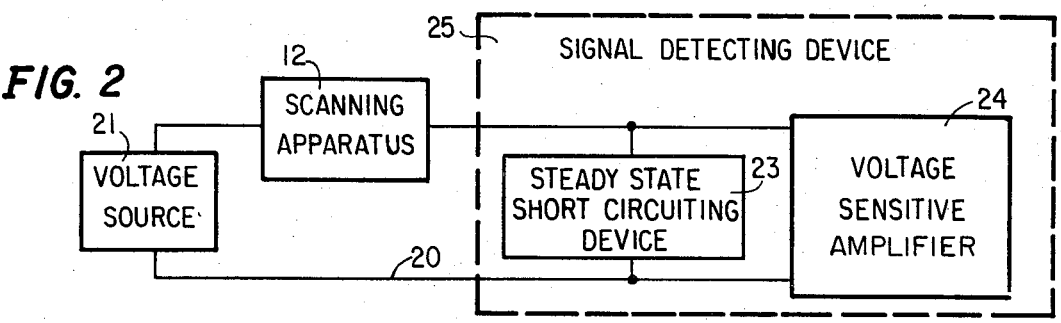
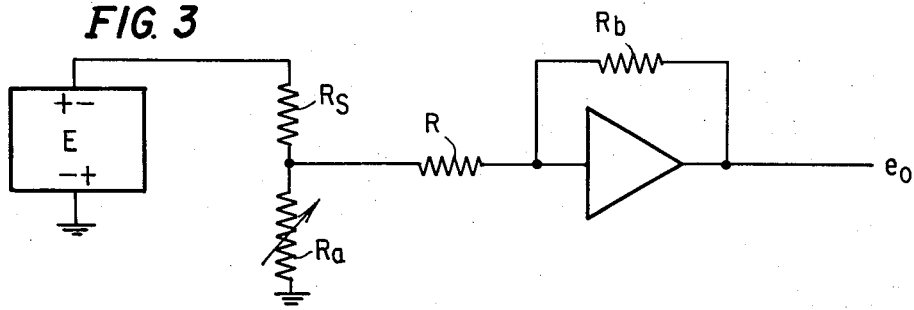
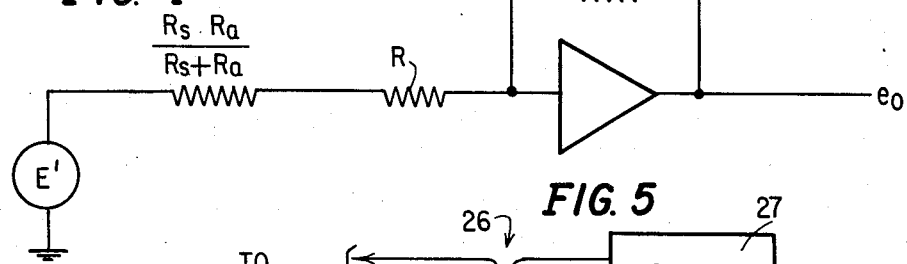
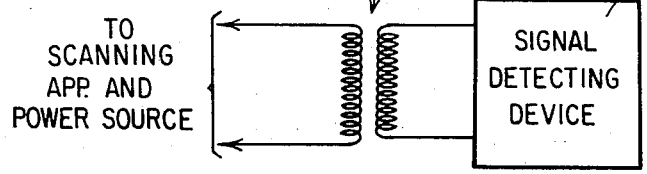
Inventors
ROBERT I. KLEIN
WALTER R. HOGG.
BY
*Silverman & Cass*
ATTYS.

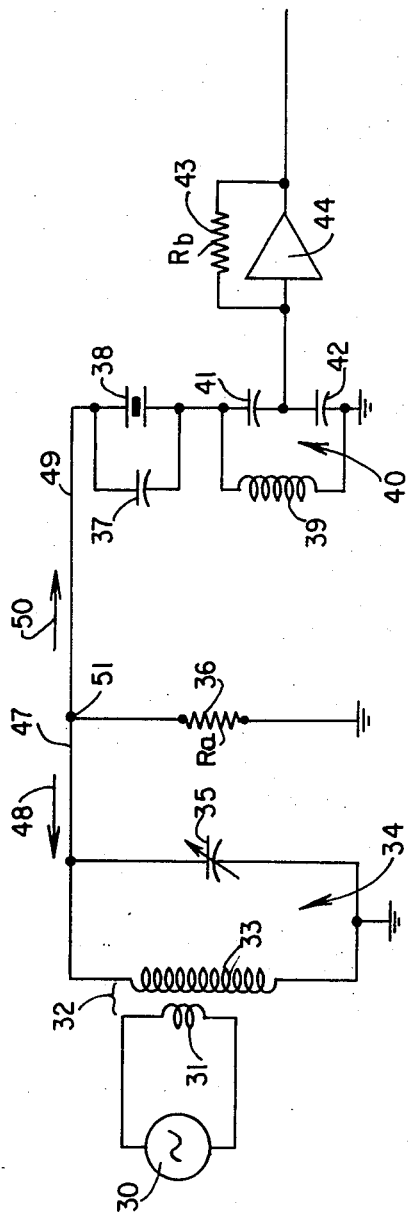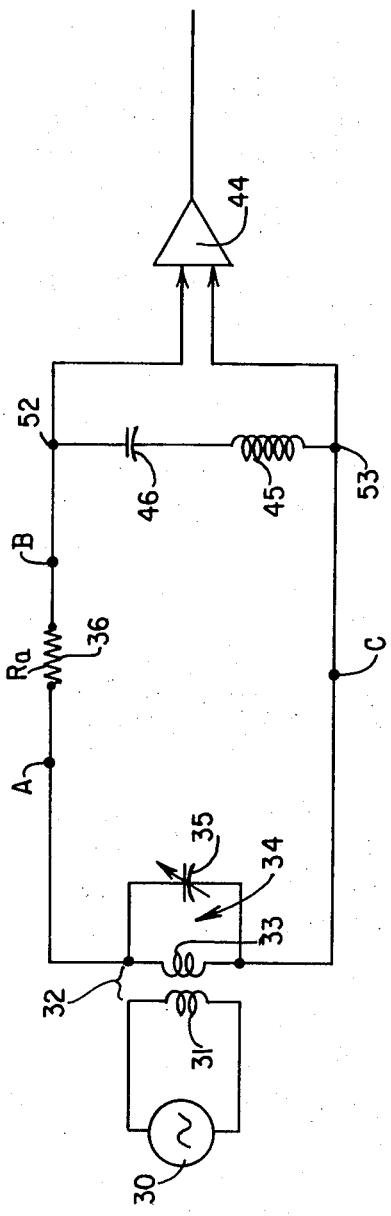

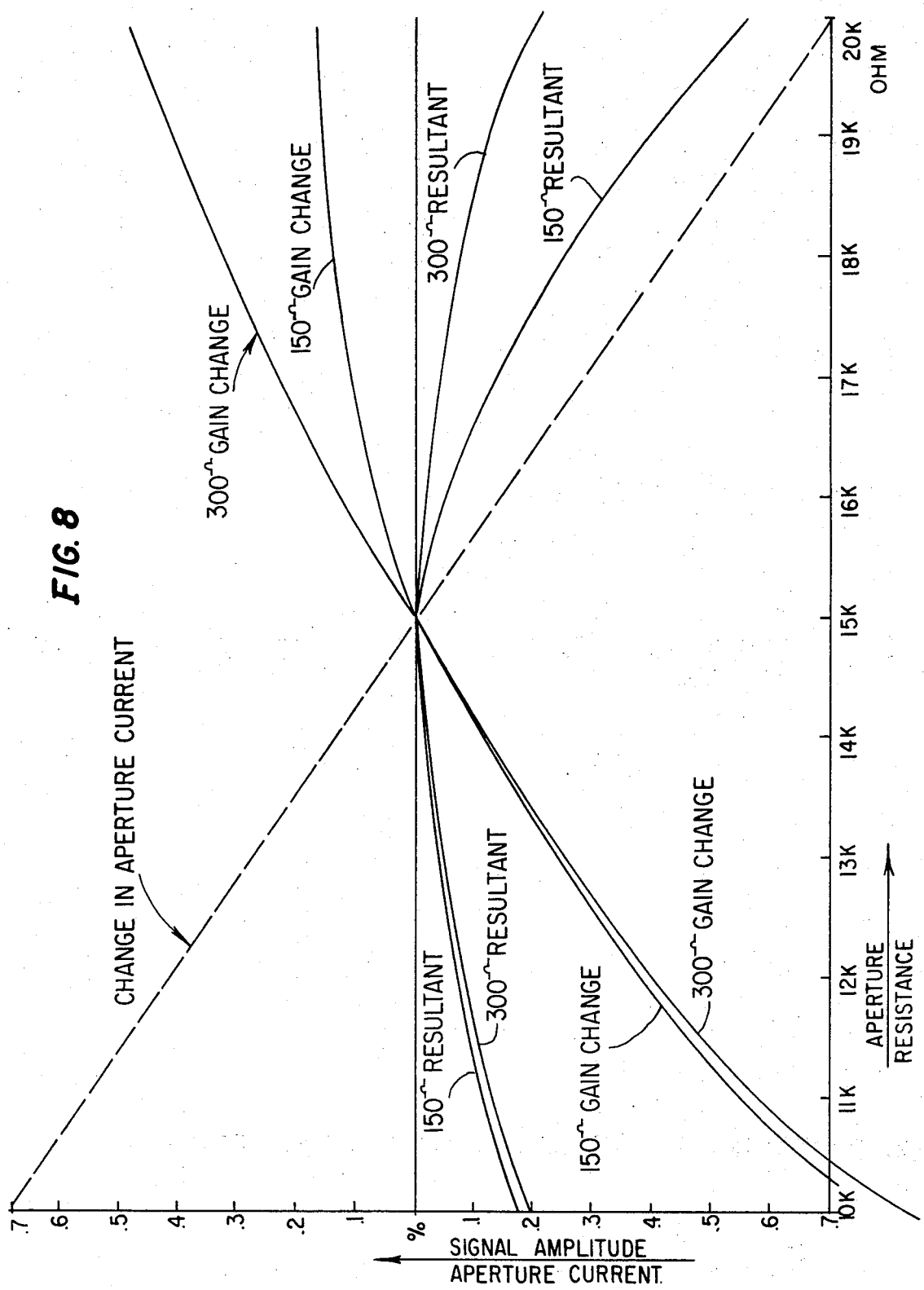

United States Patent Office 3,706,030
Patented Dec. 12, 1972

3,706,030
ELECTRONIC PARTICLE DETECTOR OF THE COULTER TYPE HAVING CONDUCTIVITY CHANGE INDEPENDENCE CIRCUITRY
Robert I. Klein, Hialeah, and Walter R. Hogg, Miami Lakes, Fla., assignors to Coulter Electronics, Inc., Hialeah, Fla.
Filed Dec. 28, 1970, Ser. No. 101,614
Int. Cl. G01n 27/00
U.S. Cl. 324—71 CP
16 Claims

ABSTRACT OF THE DISCLOSURE

Apparatus and circuitry for analyzing particles suspended in a fluid medium, including a first insulated vessel having a small aperture opening into a second insulated vessel, the fluid being in both vessels and caused to pass through the aperture. An excitation power supply source of A.C. or D.C. type produces an electric current between the two vessels, the electrical impedance of the suspension being different from that of the particles, so that a particle passing through the aperture changes the impedance of the aperture contents, thereby modulating the current in the aperture contents, and causing a signal which is applied to the input of a detector circuit comprising an amplifier. The impedance of the excitation power supply source, the impedance of the detector input and the impedance of the aperture contents are dimensioned and arranged in such a manner as to make the magnitudes of the signals independent of slow changes in electrical characteristics of the suspension.

BACKGROUND OF THE INVENTION

This invention relates generally to the art of studying particles of small diameter such as blood cells, other biological particles, foods, fibres, sediments, powders, and the like.

The apparatus here under discussion operates on the principle that a particle suspended in a fluid passing through a sensing zone changes the impedance of the suspension in the sensing zone by an amount which is a function of the size of the particle. Accordingly, a suspension of the particles it is desired to study, e.g. to count and/or size, is prepared and placed in one vessel and a second vessel having a small aperture in a side wall thereof is dipped into the first vessel. Suction is applied to the second vessel, thereby drawing the suspension through the aperture; the ensuing particle caused impedance changes are then detected.

The basic structure of apparatus of the general type here involved is described in U.S. Pat. No. 2,656,508 issued Oct. 20, 1953 to Wallace H. Coulter as well as U.S. Pat. No. 3,259,842 issued July 5, 1966 to Wallace H. Coulter et al.

In the structure described in U.S. Pat. No. 2,656,508 a sensing zone is established, commonly an aperture provided in the wall of an insulated vessel, such as; for example, adjacent the bottom end of a glass test tube, the aperture being of the order of several to several hundred microns in diameter, depending upon the nature of the particles being studied. A suspension of the particles is prepared in a suitable liquid, the electrical impedance per unit volume of which is different from that of the particles, and of known dilution in the case that an accurate particle count is one of the objects of study. Another preferably insulated vessel, such as a glass beaker, is provided with a quantity of the suspension, the aperture of the first vessel being submerged in the suspension in the second or outer vessel. A pressure differential is established between the two vessels so that the suspension will pass through the aperture from the second mentioned or outer vessel to the first mentioned or inner vessel.

The only fluid connection between the two bodies is through the aperture. A pair of electrodes is mounted relative to the two vessels and their respective bodies of suspension, so that an electric field is established in the aperture. In the simplest arrangement, an electrode is immersed in each vessel adjacent opposite side of the aperture. External leads pass from these respective electrodes to the input of a counter or detector circuitry. Due to the potential difference applied to the electrodes, a current will flow between the electrodes through the respective bodies of fluid and through the sensing zone. Each time a particle is drawn through the sensing zone there will be a detectable change in the impedance of the sensing zone contents which will produce a signal that can be measured and counted by means of the detector circuit.

Variations in the steady state impedance of aperture or sensing zone contents which may be of a slow nature are caused by many factors including temperature, conductivity and dielectric constant of the fluid, and changes in dimension of the aperture where different inner vessels are changed in studying varying characteristics of particles. Such variations of the steady state impedance cause variations in calibration of the detector circuit, in the constant of proportionality of magnitude of signal to particle volume and the like.

The particle analyzer disclosed in U.S. Pat. No. 3,259,842 to Wallace H. Coulter et al. resolves such problems by providing a constant sensing zone current utilizing a regulated source of current, the effective impedance of which is substantially infinite, and by further providing a current sensitive detecting amplifier, the input of which presents a very low impedance at the frequencies contained in the pulses. The input impedance of the amplifier is a small percentage of the impedance of the sensing zone.

It is to be noted that wherever in this application reference is made to electrical properties of the sensing zone, the intention is, generally, to properties of the contents of the sensing zone or, in more particular, to properties of the suspension fluid within the sensing zone or aperture ambit, as sensed at the coupling electrodes.

Other Coulter particle analyzers use a regulated voltage and relatively high value fixed series resistor to produce aperture current.

SUMMARY OF THE INVENTION

According to the invention, the dimensioning, in particle analyzers, of impedances of the electric power source of A.C. or D.C. type, the sensing zone contents and the input of the amplifier of the detector is established in such a manner that there is a clearly specified mathematical relation between the impedance of the power source and the nominal impedance of the aperture. When this relationship is satisfied, the magnitude of signals from the circuit due to the passing of particles through the aperture is substatially independent of slow changes in the resistivity of the suspension fluid, and this holds good over a relatively wide range of change of fluid resistivity.

Accordingly, it is an object of the invention to provide in a particle analyzer circuit, means for rendering the magnitudes of signals derived from passing of particles in a suspension through an aperture substantially independent of slow changes of resistivity of the suspension fluid.

It is a further object of the invention to achieve substantial independence of steady-state sensing zone impedance at a much lower cost than was made possible by the techniques of the earlier mentioned patents.

It is a further object of the invention to achieve this independence of steady-state sensing zone impedance using physically realizable components and alternating current sensing zone excitation.

It is a further object of the invention to provide means for establishing a relationship between the input impedance of the amplifier, on one hand, and the nominal impedance of the aperture contents and that of the excitation power source, on the other hand, such as to achieve said substantial independence.

Other objects and advantages of the invention, in addition to those enumerated will be brought out in the ensuing description of a preferred embodiment, in which the details of the invention will be explained in connection with drawings. In such explanation, the advance in the art which has been made will become apparent to those skilled in this art, and while theories have been set forth by way of explanation, these are not intended to be limiting, irrespective of whether correct or not.

BRIEF DESCRIPTION OF THE DRAWINGS

FIG. 1 is a block diagram illustrating a particle analyzing system of the prior art, in accordance with the principles of U.S. Patent No. 3,259,842 using a current sensitive detecting device including an amplifier;

FIG. 2 show a block diagram for a particle analyzing system using a voltage-sensitive detecting device including an amplifier;

FIG. 3 is a part of a circuit diagram according to the invention depicting the impedance of the excitation power source, the aperture and the amplifer;

FIG. 4 is a diagram equivalent to that of FIG. 3 wherein the impendances of the excitation power source and the aperture have been combined according to Thevenin's theorem;

FIG. 5 is a portion of a diagram analogous to that shown in FIG. 2 but having transformer coupling to the signal detecting device;

FIG. 6 is a block diagram illustrating a particle analyzing system analogous to FIG. 1, but wherein alternating current sensing zone excitation is used;

FIG. 7 is a block diagram illustrating a particle analyzing system analogous to FIG. 2, but wherein alternating current sensing zone excitation is used; and FIG. 8 is a chart, illustrating test results in examining change of signal magnitude as a function of change of aperture impedance and sensing zone excitation current.

DESCRIPTION OF THE PREFERRED EMBODIMENTS

Referring to the drawings, FIGS. 1 and 2 illustrate in block diagrams two principles of circuit connections between an electric power source, a scanning apparatus and a signal detecting device.

The circuit 10 of FIG. 1 comprises an electric excitation current or power source 11, a scanning aparatus 12, a steady state open circuiting device 13 and a current sensitive amplifier 14. The current source 11 has a high source impedance.

The current source 11 and the scanning device 12 are in series connection with one another. The device 13 is a steady state open circuiting device and is series connected with the amplifier 14 and this series combination is in parallel with the scanning device 12. For direct current scanning device excitation, the device 13 may be a simple D.C. blocking capacitor. The amplifier 14 has an input impedance in the frequency band occupied by the signals lower than that of the scanning device and may be considered current sensitive. It may be of the type described in the previously noted U.S. Patent No. 3,259,842. The steady state open-circuiting device 13 and the amplifier 14 together constitute signal detecting device 15. The steady-state open-circuiting device has two functions secondary in importance to the main thrust of the invention: (1) to prevent excitation energy loss by being diverted away from the scanning device, and (2) to avoid overloading the detector with the steady state excitation which is very large compared to the signals generated.

The circuit 20 of FIG. 2 comprises a voltage source 21, a scanning apparatus 12, a steady state short-circuiting device 23 and an amplifier 24. The steady-state short-circuiting device has the same function as the steady-state open-circuiting device of the previous figure, which is the "dual" of this one. The voltage source has a low source impedance. For direct current scanning device excitation, the steady-state short-circuiting device 23 may be a simple inductance. For high frequency alternating current excitation, as will be shown hereinafter, this may be a network which has small impedance at the carrier frequency but high impedance to the frequencies of the sidebands carrying the particle information. Unavoidable remnant impedances may be lumped into generator and amplifier input impedances. With regard to the circuit arrangements between these elements, the voltage source 21, the signal detecting device 25, the scanning apparatus 12 are in series connection with one another, while the amplifier 24 is parallel coupled to the steady state short-circuiting device 23. This amplifier 24 has an input impedance much higher than the impedance of the scanning device and may be considered voltage sensitive. Steady-state short-circuiting device 23 and amplifier 24 together constitute signal detecting device 25. This configuration is described in patent application Ser. No. 882,366 by Sheldon L. Epstein.

FIG. 3 shows that part of a circuit diagram of a particle analyzing device, which is of particular relevance to the subject matter of the invention. It includes an electric power source E which may be of the current source type or voltage source type as explained hereinafter. It further includes various impedances of which the impedance $Z_s$ is the internal impedance of the electrical power source E plus an external series impedance, if any. In some embodiments this will consist almost entirely of the series impedance. $Z_a$ is the nominal impedance of the aperture fluid within the scanning apparatus 12, called hereinafter aperture impedance; Z is the impedance of the amplifier A; and $Z_b$ is the feed-back impedance of the amplifier A.

In examining the interrelations between these impedances they will be assumed to be resistances for simplicity. Accordingly, in FIG. 3 and the subsequent discusison, the Z-values are presented as R-values, such that $Z_s$ is $R_s$, $Z_a$ is $R_a$, Z is R and $Z_b$ is $R_b$. It is to be noted that the aperture current supply is not electronically regulated, but there is simply a large resistance $R_s$ between a low resistance voltage source E and the aperture resistance $R_a$. The aperture current is determined by the voltage of the power source and the combined resistance of resistor $R_s$ and the aperature resistance $R_a$. When resistance $R_a$ varies up and down from the nominal value due to changes in electrical properties of the suspending fluid, the aperture current varies but slightly if the series resistor $R_s$ is many times larger than $R_a$, and appreciably if not.

In a practical test example $R_s$, was 700 kilohms and the nominal aperture resistance $R_a$ was 15 kilohms. Thus, as $R_a$ varied from 10 kilohms to 20 kilohms as it fluctuated about its nominal value, the aperture current varied by about plus and minus 0.7 percent. The input resistance R of the amplifier circuit A was very low, almost zero for all practical purposes, so that as the aperture current increased, due to a drop in $R_a$, the signal at the output of the amplifier caused by a particle passing the aperture increased by a like amount. It should be understood that the term signal denotes signal magnitude or signal amplitude as made available at the output of the amplifier.

On the other hand, considering a voltage-sensitive system, i.e., if the amplifier 14 of FIG. 1 had very high input impedance, it is readily seen that when the aperture resistance $R_a$ decreases, the signal developed by a particle passage decreases proportionately, because the basic signal, which is the change of resistance which gives rise to the measurable current and/or voltage signal is always a given percentage of the aperture resistance $R_a$ for a given size particle. At the same time, the aperture current increases by only a slight amount, because it is controlled principally by the source resistance $R_s$.

We are therefore faced with a situation in which on the one hand, in the current-sensitive system, a decrease of aperture resistance $R_a$ increases the signal while on the other hand in the voltage-sensitive system a decrease of aperture resistance $R_a$ decreases the signal. We may therefore assume that at some value of input resistance R between the two extremes, the signal must neither increase or decrease.

In calculating the signals for several values of resistance R in the input lead of the amplifier A, it was found that a 300 ohm resistance resulted in practically no change in signal as the aperture resistance $R_a$ was changed from 10 kilohms to 20 kilohms, when the other resistances were those of the test example given above.

FIG. 8 represents a chart illustrating changes of signal amplitude and aperture current when the aperture resistance $R_a$ is changed. In the chart, the x-axis shows the aperture resistance $R_a$ ranging from 10 kilohms to 20 kilohms. On the y-axis changes of signal amplitude and aperture current in percent are recorded ranging from zero to ±.7%. Curves were plotted with parameters of 150 ohms and 300 ohms for the input resistance R of the amplifier A. It is readily seen that the best result, i.e. the smallest change of signal magnitude, is obtained for an input resistance R of about 300 ohms. Recognition of the fact that 15,000 is approximately the geometric mean between 700,000 and 300 called for the search of a general solution by way of mathematical analysis. This analysis has now established the rule that these proportions will always produce the desired result.

This was done by expressing the output voltage of the amplifier 14 as a function of all the resistances involved, differentiating with respect to $R_a$, setting this equal to zero and solving for the amplifier input resistance R. This procedure was followed because in the problem at hand, $R_s$ and $R_a$ were given. Any of the three might have been considered the unknown.

The mathematical derivation is as follows:

Considering the circuit as illustrated in FIGS. 3 and 4 the output voltage $e_0$ of the amplifier may be expressed by utilizing Thevenin's Theorem as:

$$e_0 = \frac{E}{R_a + R_s} \cdot K R_a \cdot \frac{R_s}{R_a + R_s} \cdot \frac{R_b}{R + \frac{R_s R_a}{R_s + R_a}} \quad (1)$$

wherein the term $$\frac{E}{R_a + R_s}$$

represents the aperture current; the term $KR_a = \Delta R$, the change of resistance due to passage of a particle through the aperture, ($K = .01\%$ for red bleed cell in saline and 100 micron aperture); the term $$\frac{R_s}{R_a + R_s}$$

represents attenuation due to loading effect of $R_s$; and the term $$\frac{R_b}{R + \frac{R_s R_a}{R_s + R_a}}$$

represents the gain of the amplifier after feedback.

(1) can be reduced to $$e_0 = KER_a R_b \frac{R_s}{(R_a + R_s)(RR_a + RR_s + R_a R_s)} \quad (2)$$

Now differentiating with respect to $R_a$ results in:

$$\frac{\partial e_0}{\partial R_a} = KER_s R_b \frac{RR_s^2 - RR_a^2 - R_a R_s^2}{[(R_a + R_s)(RR_a + RR_s + R_a R_s)]^2} \quad (3)$$

To find the conditions under which changes in $R_a$ have the least effect, $\partial e_0 / \partial R_a$ is set equal to zero; then solving for R $$R = \frac{R_s R_a^2}{R_s^2 - R_a^2} \quad (4)$$

Which may be solved for $R_a$ to obtain $$R_a = R_s \cdot \frac{R}{R + R_s} \quad (5)$$

If we now introduce, for simplification purposes, a term M where $$M = \frac{R_s}{R_a} \quad (6)$$

and $$R_s = MR_a \quad (7)$$

we obtain $$R = \frac{M}{M^2 - 1} R_a \quad (8)$$

Solving Equation 8 for $R_a$, we receive $$R_a = \frac{M^2 - 1}{M} R \quad (9)$$

Substituting in Equation 9 the value of M as expressed in Equation 6, simplifying and omitting intermediate steps, we obtain the general formula for the interrelations between the impedances $R_s$, $R_a$ and R in the equation:

$$R_a = R_s \sqrt{\frac{R}{R + R_s}} \quad (10)$$

Now, going to the specific and usual situation, wherein the power source resistance is larger than the aperture resistance, that is $$\frac{R_s^2}{R_a^2} \gg 1$$

and since $$M^2 = \frac{R_s^2}{R_a^2}$$

then $$R \cong \frac{1}{M} R_a \quad (11)$$

A term $a$ is, by definition, the geometric means of terms $b$ and $c$ when $$a = \sqrt{bc} \quad (12)$$

or, $$a^2 = bc \quad (13)$$

It follows that if $R_a$ is to be the geometric mean of R and $R_s$ it must satisfy the equation $$R_a^2 = RR_s \quad (14)$$

Applying now Equation 11 and substituting therein Equation 6 we obtain:

$$R = \frac{R_a^2}{R_s} \quad (15)$$

from which $$R_a^2 = RR_s \quad (16)$$

which is identical with Equation 14. This, then shows that the observation noted above that $R_a$ is the geometric mean between R and $R_s$ has been proven as theoretically correct.

As an illustration of the effectiveness of the invention using calculated values, consider a case in which it is known that the aperture resistance will lie somewhere between 10 and 20 kilohms, and that a 700 kilohms series source resistance is required to limit the aperture current to the desired value. In this case we assume the nominal aperture resistance to be 14 kilohms, which is approximately the geometric mean between the extremes permissible, so that it may vary up and down by the same factor. The factor M then becomes, by Equation 6, 700,000 divided by 14,000 or 50. The required amplifier input impedance becomes in turn 14,000 divided by 50 or 280 ohms. If we assume a modulation percentage $k$ of 0.01% and a feedback resistor which determines the gain of the amplifier $R_b$ of 100,000 ohms, and substitute these values into Equation 2, the signal voltage $e_0$ appearing at the output of the detector is according to the following table.

| $R_a$ (ohms) | $e_0$ (volts) |
|---|---|
| 10,000 | 1.369555 $(10^{-3})$ |
| 14,000 | 1.372560 $(10^{-3})$ |
| 20,000 | 1.369173 $(10^{-3})$ |

It is apparent that with this value of M, the signal due to the size particle which produces 0.01% modulation of the aperture resistance drops only 0.2% as the aperture resistance changes from the nominal to either extreme indicated. This can be expressed as ±0.1% deviation from the median value, which is a high degree of accuracy for an analog instrument.

As a result, it is possible to use a much higher input resistance amplifier and a much lower resistance power source without sacrificing independence from conductivity changes. The mathematical approach is general, and will hold for any set of values as long as the criterion that the input resistance of the amplifier is $M/(M^2-1)$ of the nominal aperture resistance, where M is the ratio of the series current-limiting resistance $R_s$ and the aperture resistance $R_a$ is met. If, in the extreme case, $R_a$ is made equal to $R_s$, the amplifier input resistance R must be made infinite which is the case of a voltage sensitive amplifier, but the independence of conductivity still holds in the vicinity of the nominal value of the aperture resistance $R_a$.

It can also be shown by a similar procedure that if the configuration of FIG. 2 is used, in which the power source resistance is smaller than the aperture resistance, independence from conductivity changes can be achieved by maintaining the relationship $$R = R_a \frac{N^2-1}{N} \quad (15)$$

wherein $$N = \frac{R_a}{R_s}$$

and R is the input resistance of the amplifier used. Again, the aperture resistance must approximate the geometric mean between the resistances of the source and the detecting amplifier. The extreme case of this combination is disclosed in copending application Ser. No. 882,366 by Epstein, in which source resistance is made nearly zero as possible, and the input resistance of the amplifier is made practically infinite.

Application Ser. No. 882,366 and Pat. 3,259,842 are thus special cases of the present invention in which the value of N or M is very large, approaching infinity. The larger the value of M or N, the wider the range over which the aperture resistance may vary without appreciably affecting calibration of the complete Coulter Counter.

Another benefit derived from this scheme is that it allows the use of a transformer, auto-transformer or other impedance matching circuits at the input of the amplifier 27, as illustrated in FIG. 5. Among other benefits, this permits the design of the amplifier input circuitry for optimum matching for best signal-to-noise ratio. If, for example, $R=10$ kilohms, $R_a=15$ kilohms and $R_s=30$ kilohms, the amplifier input impedance requirement can be met easily with an impedance matching transformer. In this event, a turns ratio can be chosen which gives maximum signal-to-noise ratio for whatever amplifier is used.

A most important effect of this invention is achieved in using high frequency aperture current, as in one of the present applicants' U.S. Patent No. 3,502,974. This is so because at high frequency it is more difficult to produce the infinite-resistance source which is made use of in the U.S. Patent No. 3,259,842 and in certain DC Coulter Counters. When using AC, the aperture current supply is most conveniently a tank i.e., energy-storing resonant circuit and the amplifier and input transformer if used is usually turned so as to cancel the capacitance to ground. The technique of this invention makes it unnecessary to use near-infinite and near-zero resistances, easy to achieve at DC but difficult at RF.

While the preceding discussions of circuit elements and impedance relations are directed to particle analysers in general, regardless of whether the electrical power source used is of the direct current or alternating current type, FIGS. 6 and 7 illustrate embodiments of the invention in which, specifically alternating current is used. Such alternating current would most likely be in what is generally thought of as the radio frequency range, but it is not necessarily restricted to this part of the spectrum.

Referring now to FIG. 6, the scanning device excitation is supplied by a source of alternating current energy such as oscillator 30 which is coupled into a tank circuit 34 by means of a primary coil 31 and a mutual inductance indicated by brace 32 relative to a secondary coil 33. The tank 34 comprising a condenser 35 and its coupling means, provide the necessary voltage at node 51 for the aperture current required with the desired impedance looking back into the power source.

The aperture impedance $R_a$ represented by resistor 36 is connected to the power source circuit by a line 47 and is coupled to the amplifier 44 by a line 49, a crystal 38 and a tank circuit 40.

The tank circuit 40 is also an impedance transformation device such that looking to the right from the node 51 as indicated by arrow 50, the impedance has the required value. As explained above, this will be $1/M$ of the nominal aperture impedance, or $M/(M^2-1)$ if M is small. Likewise, the impedance looking to the left from node 51 as indicated by arrow 48 should be M times greater than the nominal aperture impedance.

The crystal 38 is in parallel resonance with its inherent capacitance and the capacitor 37 at the carrier frequency and introduces a very high series impedance in the path to the amplifier at the carrier frequency. It is so designed that its series resonance occurs at a frequency sufficiently close to its anti-resonant frequency that there is no signal energy, i.e. no sideband there. Well away from these critical frequencies, the resulting trap has a moderately low impedance, and passes the sidebands onto the amplifier 44. It is the impedance looking to the right of the node 51 at the sideband frequencies which is used in the formula of the invention.

In FIG. 7, the dual of the original conductivity-independent circuit as disclosed in patent application Ser. No. 882,366 by Epstein is approximated with finite impedances using alternating-current excitation. As in FIG. 6, the excitation is transformer coupled and the impedance looking back to the left between points A and C is the source impedance, wherein point A is any point along a lead connecting the tank 34 with the left electrode, as viewed in the drawing, of the aperture resistor 36, and point C is any point along a lead connecting tank 34 with a node 53 which couples the lines to amplifier 44 and a circuit 45, 46. The impedance looking to the right, between points B and C is the amplifier impedance, wherein point B is any point along a lead connecting the right electrode of the aperture resistor 36 and a node 52 which couples the lines to the amplifier 44 and the circuit 45, 46. As in FIG. 2, the series resonant circuit comprising inductance 45 and capacitance 46 serves as a steady-state, i.e. carrier short circuiting device and is designed to have very low impedance at the carrier frequency. Aperture current flows due to the voltage appearing between points A and C. B is at the potential of point C because of the low impedance of the series trap 45, 46. The tank 34 has desirably a small inductance 33 and high capacitance 35 and in concert with the impedances reflected from the primary circuit provides an impedance which is small across the frequency band of interest, i.e., twice the bandwidth of the signals produced if the same scanning element is excited by direct current means, i.e., carrier plus and minus the sidebands.

The trap 45, 46 prevents carrier voltage from saturating the amplifier 44. Its impedance at the carrier frequency may be included in the impedance of the source. Its impedance at the frequency of the sidebands, in parallel with the input impedance of the amplifier 44, is the R of the invention which must be made N or $(N^2-1)/N$ larger than the aperture impedance.

What it is desired to be secured by Letters Patent of the United States is:

1. Apparatus for studying the physical properties of particles suspended in a fluid medium of different electrical properties than said particles, said apparatus comprising a source of electrical power having a finite source impedance, means establishing a constricted path in the suspension fluid, the fluid contents of said path having an electric impedance, circuit means including said power source for enabling an electric current to flow through said fluid path such that particles passing through said fluid path will modulate said current to produce signals, said apparatus further including detecting means connected to said power source and said fluid path for detecting said signals, said detecting means having a finite input impedance and producing output signals; and means for rendering said output signals substantially independent of slowly occurring changes of said electrical properties of the fluid medium over a predetermined range of values of the impedance of the fluid path contents, such independence rendering means comprising an arrangement of the impedance values of the electric power source, the fluid path contents, and the detecting means which define a predetermined mathematical interrelationship with respect to each other.

2. Apparatus as set forth in claim 1, wherein the source impedance of the electrical power source and the input impedance of the electrical detecting means are dimensioned such that the nominal impedance of the fluid path is $(M^2-1)/M$ times larger than the input impedance of the detecting means, wherein M is the ratio of the power source impedance and the nominal fluid path impedance.

3. Apparatus as set forth in claim 2 wherein the electrical power source is a direct current power source, and the electrical detecting means has relatively low input impedance at frequencies contained by said output signals.

4. Apparatus as set forth in claim 2 wherein the electrical power source is an alternating current power source having a carrier frequency, and the electrical detecting means has relatively low input impedance in frequency bands containing the sidebands of the carrier frequency which constitute said output signals.

5. Apparatus as set forth in claim 1, wherein the source impedance of the electrical power source and the input impedance of the electrical detecting means are dimensioned such that the nominal impedance of the fluid path is $N/(N^2-1)$ times smaller than the input impedance of the electrical detecting means, wherein N is the ratio of the fluid path impedance divided by the source impedance of the electrical power source.

6. Apparatus as set forth in claim 5 wherein the electrical power source is a direct current power source and the electrical detecting means has relatively high input impedance at frequencies contained by said output signals.

7. Apparatus as set forth in claim 5 wherein the electrical power source is an alternating current power source having a carrier frequency, and the electrical detecting means has relatively high input impedance in frequency bands containing the sidebands of the carrier frequency which consistute said output signals.

8. Apparatus as set forth in claim 1, wherein the source impedance of the electrical power source and the input impedance of the electrical detecting means are dimensioned such that the nominal impedance of the fluid path is approximately the geometric mean of the source impedance and the detector impedance.

9. Apparatus as set forth in claim 8, wherein the source impedance of the electrical power source is smaller than the nominal impedance of the fluid path and the input impedance of the detecting means is larger than the resistance of the fluid path.

10. Apparatus as set forth in claim 9, wherein the electrical power source is a direct current power source.

11. Apparatus as set forth in claim 9, wherein the electrical power source is an alternating current power source.

12. Apparatus as set forth in claim 8 wherein the source impedance of the electrical power source is larger than the nominal impedance of the fluid path, and the input impedance of the detecting means is smaller than the nominal impedance of the fluid path.

13. Apparatus as set forth in claim 12, wherein the electrical power source is an alternating current power source.

14. Apparatus as set forth in claim 12, wherein the electrical power source is a direct current power source.

15. Apparatus as set forth in claim 14, wherein the electrical power source resistance is in the order of 700,000 ohms, the input impedance of the detecting means is approximately 280 ohms, and the fluid path impedance lies between 10,000 and 20,000 ohms with a nominal value of 14,000 ohms.

16. Apparatus as set for in claim 1, wherein the source impedance of the electrical power source and the input impedance of the electrical detecting means are dimensioned such that the nominal impedance of the said fluid path is the product of the electrical source impedance and the square root of the quotient of the detector input impedance divided by the sum of the detector input impedance and the electrical source impedance.

References Cited

UNITED STATES PATENTS

| | | | |
|---|---|---|---|
| 2,656,508 | 10/1953 | Coulter | 324—71 |
| 3,259,842 | 7/1966 | Coulter et al. | 324—71 |
| 3,287,638 | 11/1966 | Bolie | 324—71 |
| 3,056,919 | 10/1962 | Kuipers | 324—30 |

STANLEY T. KRAWCZEWICZ, Primary Examiner

UNITED STATES PATENT AND TRADEMARK OFFICE
CERTIFICATE OF CORRECTION

PATENT NO. : 3,706,030
DATED : December 12, 1972
INVENTOR(S) : Robert I. Klein, et al It is certified that error appears in the above-identified patent and that said Letters Patent are hereby corrected as shown below:

In column 6, lines 17-19 change formula (5) from

"$R_a = R_s \cdot \dfrac{R}{R+R_s}$" to -- $R_a = R_s \sqrt{\dfrac{R}{R+R_s}}$ --.

Signed and Sealed this

Tenth Day of May 1977

[SEAL]

*Attest:*

RUTH C. MASON
*Attesting Officer*

C. MARSHALL DANN
*Commissioner of Patents and Trademarks*